United States Patent [19]
Inaba

[11] Patent Number: 5,715,489
[45] Date of Patent: Feb. 3, 1998

[54] STEREO CAMERA

[76] Inventor: Minoru Inaba, No. 1116, Oaza Samukawa, Oyama-shi, Tochigi-ken, Japan

[21] Appl. No.: 630,438

[22] Filed: Apr. 10, 1996

[51] Int. Cl.$^6$ .......................... G03B 35/00; G03B 13/08
[52] U.S. Cl. ........................................ 396/327; 396/386
[58] Field of Search ........................ 354/114, 112, 354/113, 115, 219, 220, 221, 222, 223, 224, 225, 162, 166; 396/377, 384, 385, 386, 322, 324, 326, 331, 355, 329

[56] References Cited

U.S. PATENT DOCUMENTS

| | | | |
|---|---|---|---|
| 1,596,835 | 8/1926 | Hewson | 359/462 |
| 1,871,281 | 8/1932 | Savage | 359/618 |
| 2,458,466 | 1/1949 | Campbell | 95/18 |
| 2,803,179 | 8/1957 | Donaldson | 396/326 |
| 3,068,772 | 12/1962 | MacNeille | 354/166 |
| 3,115,816 | 12/1963 | Muller | 95/18 |
| 3,608,458 | 9/1971 | Ratliff, Jr. | 95/18 |
| 3,687,031 | 8/1972 | Jahnsman | 95/11 |
| 3,837,726 | 9/1974 | Suzuki et al. | 350/3.5 |
| 3,906,528 | 9/1975 | Johnson | 354/162 |
| 3,953,869 | 4/1976 | Wah Lo et al. | 354/112 |
| 3,967,300 | 6/1976 | Oshima | 354/288 |
| 4,005,447 | 1/1977 | Filipovich | 354/166 |
| 4,040,071 | 8/1977 | Shane | 354/113 |
| 4,249,798 | 2/1981 | Moskovich | 350/423 |
| 4,290,693 | 9/1981 | Stein | 356/1 |
| 4,384,762 | 5/1983 | Fujibayashi et al. | 350/286 |
| 4,418,993 | 12/1983 | Lipton | 352/57 |
| 4,462,025 | 7/1984 | Murakami et al. | 340/753 |
| 4,490,814 | 12/1984 | Senk | 367/140 |
| 4,597,659 | 7/1986 | Suda et al. | 354/409 |
| 4,685,787 | 8/1987 | Kinnard | 354/83 |
| 4,712,900 | 12/1987 | Hamano et al. | 354/400 |
| 4,879,596 | 11/1989 | Miura et al. | 358/88 |
| 5,504,547 | 4/1996 | Mizukawa | 354/114 |
| 5,548,362 | 8/1996 | Wah Lo et al. | 396/326 |
| 5,576,783 | 11/1996 | Lee | 396/322 |
| 5,581,318 | 12/1996 | Shiratori | 396/296 |

*Primary Examiner*—Safet Metjahic
*Assistant Examiner*—Christopher E. Mahoney
*Attorney, Agent, or Firm*—Fattibene and Fattibene; Paul A. Fattibene; Arthur T. Fattibene

[57] ABSTRACT

A prism 11 installed over focal plates 9 and 10 of a reflex-type stereo camera 1 is a composite prism forming two right and left inversion prisms as a unitary structure. The inner one-half pictures of the right and left inverted pictures on the focal plates 9 and 10 are inverted right side left through the prism 11, so that an erect image of the outer one-half picture in the photographing range of the left lens 5 is projected onto the left side of the central projection plane of the prism 11 and an erect image of the outer one-half picture in the photographing range of the right lens 4 is projected onto the right side thereby to synthesize a picture. Thus, the right and left images can be simultaneously seen through one finder, making it easy to view the image and to operate the camera.

4 Claims, 18 Drawing Sheets

STEREO CAMERA

BACKGROUND OF THE INVENTION

The present invention relates to a stereo camera and, particularly, to a reflex-type stereo camera having an improved finder.

DESCRIPTION OF THE PRIOR ART

A reflex-type stereo camera has heretofore been known mounting on a camera body two optical systems of a single-lens reflex camera. The finder of a reflex-type stereo camera of this kind employs a pentaprism of the single-lens reflex camera. As is well known, however, the pentaprism requires precision working and is very expensive to produce driving up the cost of the stereo camera that uses two pentaprisms.

Besides, the structure in which two finders are arranged in parallel so that a finder image can be seen by two eyes, does not necessarily permit the user to take an easy view. Being limited by the outer diameter of the lens and the size of the lens-mounting mechanism, in particular, the user finds it difficult to take a simultaneous look through the two finders of the stereo camera in which the pitch between the two optical systems is larger than a distance (about 63.5 mm) between two human eyes. In many cases, therefore, a picture is taken while viewing through either one of the finders. That is, the picture is not often viewed through the other finder, and it often happens that an obstacle is photographed on one picture, or taking a picture results in failure due to raindrops or dust adhered to one lens.

It therefore becomes necessary to solve the above-mentioned technical problem, so that the right and left focal plate images can be viewed through only one finder making it easy to confirm the images and easy to operate the camera, and that the finder is simply constituted contributing to lowering the cost. The object of the present invention therefore is to solve the above-mentioned technical problem.

SUMMARY OF THE INVENTION

In order to accomplish the above-mentioned object, the present invention provides a stereo camera of the reflex type comprising two right and left optical systems, a left optical system and a right optical system, of a single-lens reflex camera each including a lens, a reflex mirror and a prism, which are mounted on a camera body, enabling images incident on the right and left lenses to be observed through the reflex mirrors and the prisms, wherein a composite prism is provided to synthesize an erect image by symmetrically inverting right side left the outer one-half pictures within the photographing ranges of the right and left lenses, so that outer one-half pictures within the photographing ranges of the right and left lenses can be observed by one eye.

The invention further provides a stereo camera wherein the distance between the centers of the right and left lenses is freely adjusted, and an interlocking mechanism is disposed between a focal point adjusting mechanism and a mechanism for adjusting the distance between the centers of the lenses, so that the photographing ranges of the right and left lenses at a focal distance are brought into agreement with each other at all times.

BRIEF DESCRIPTION OF THE DRAWINGS

FIG. 5 illustrates another embodiment of the prism, wherein

FIG. 8 a prism in the stereo camera of FIG. 7, wherein

FIG. 16 is a diagram of a subject, wherein

DESCRIPTION OF THE PREFERRED EMBODIMENTS

Figure 1:
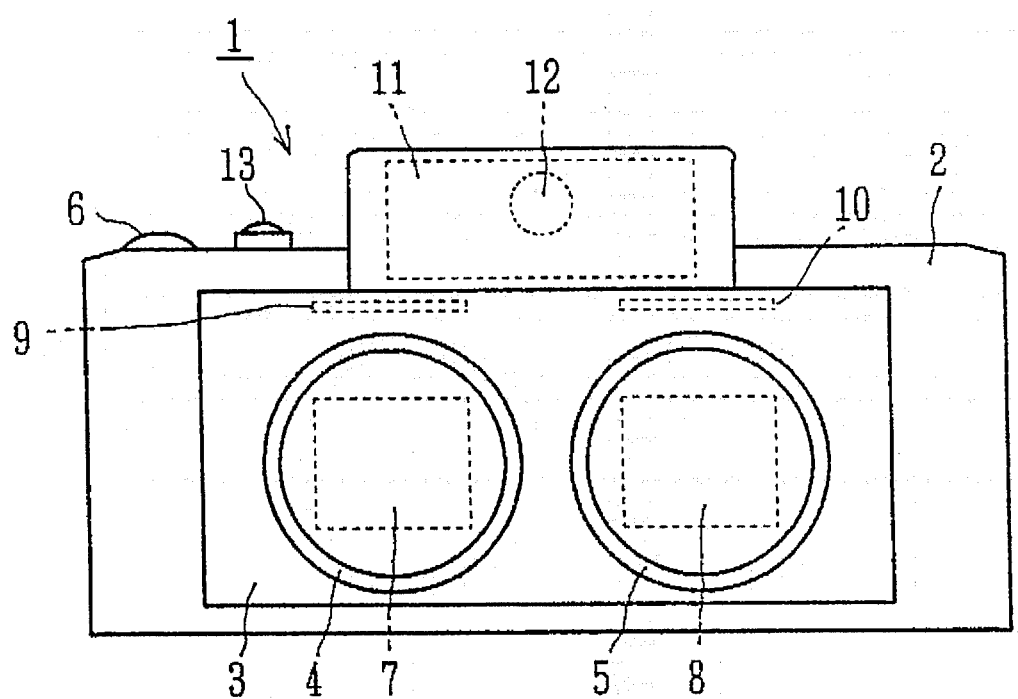
FIG. 1 is a front view of a stereo camera.
Figure 2A:
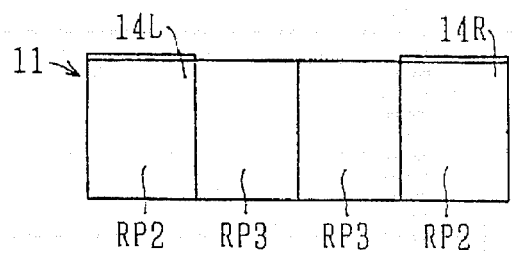
FIG. 2 shows a prism in the stereo camera of FIG. 1, wherein 2a is a back view, 2b is a plan view.
FIG. 2c is a front view.
FIG. 2d is a bottom view.
FIG. 2e is a view along the line A—A of FIG. 2b.
FIG. 2f is a side view.
Figure 2E:
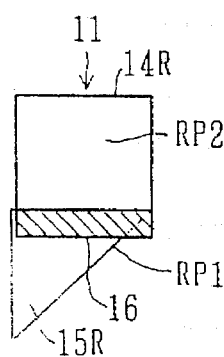
Figure 2B:
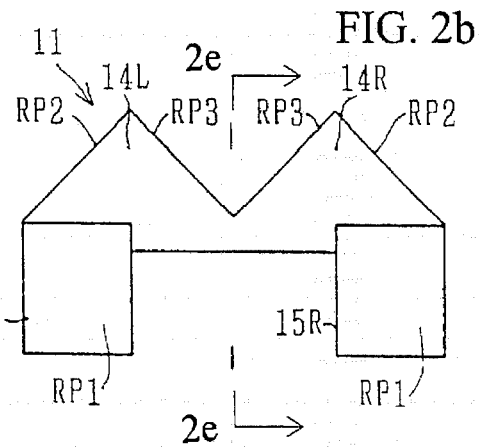
Figure 2F:
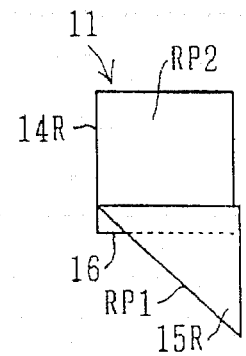
Figure 2C:
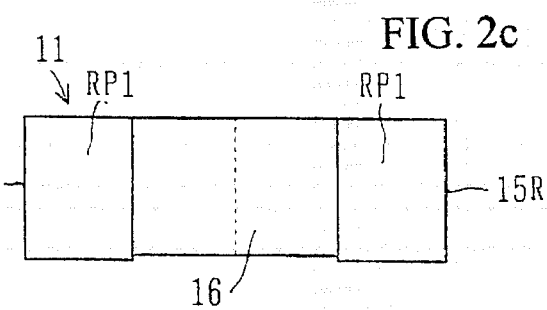
Figure 2D:
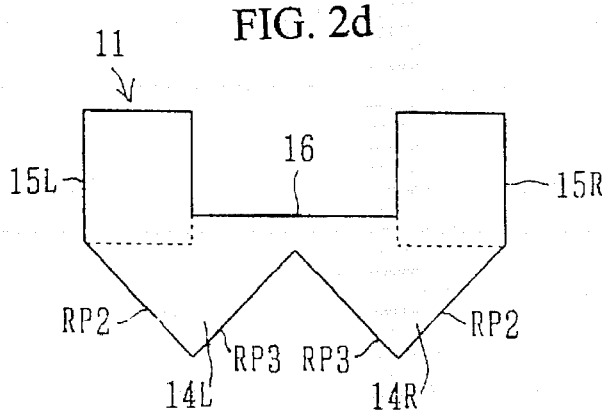

Embodiments of the present invention will now be described in detail. FIG. 1 illustrates a stereo camera 1, wherein a slide frame 3 is mounted on a camera body 2 to slide back and forth, and two lenses 4 and 5 are mounted in front of the slide frame 3. Upon turning a focal point-adjusting dial 6, the slide frame 3 moves back and forth via an adjustment mechanism (not shown) such as feed screw mechanism or cam mechanism, so that focal points of the lenses 4 and 5 can be adjusted.

The light rays incident upon the lenses 4 and 5 are upwardly reflected by reflex mirrors 7 and 8 to form images on focal plates 9 and 10. A composite prism 11 is disposed over the focal plates 9 and 10, and images on the right and left focal plates can be viewed through an eyepiece 12. Reference numeral 13 denotes a shutter button, and a focal plane shutter (not shown) is disposed at the back of the reflex mirrors 7 and 8. It is desired that the pitch between the centers or optical axes of the lenses 4 and 5 is about 63.5 mm which is a distance between two human eyes.

The prism 11 is made of an optical resin or an optical glass and comprises two total reflection prisms formed symmetrically as a unitary structure. Referring to FIG. 2, 90-degree reflection prism units 15L and 15R for introducing the light rays from the lower direction are joined to the outer one-half portions of the planes of incidence of the two 180-degree reflection prism units 14L and 14R that are joined in parallel. The inner one-half portions of the 180-degree reflection prism units 14L and 14R constitute a continuous projection plane 16.

Figure 3:
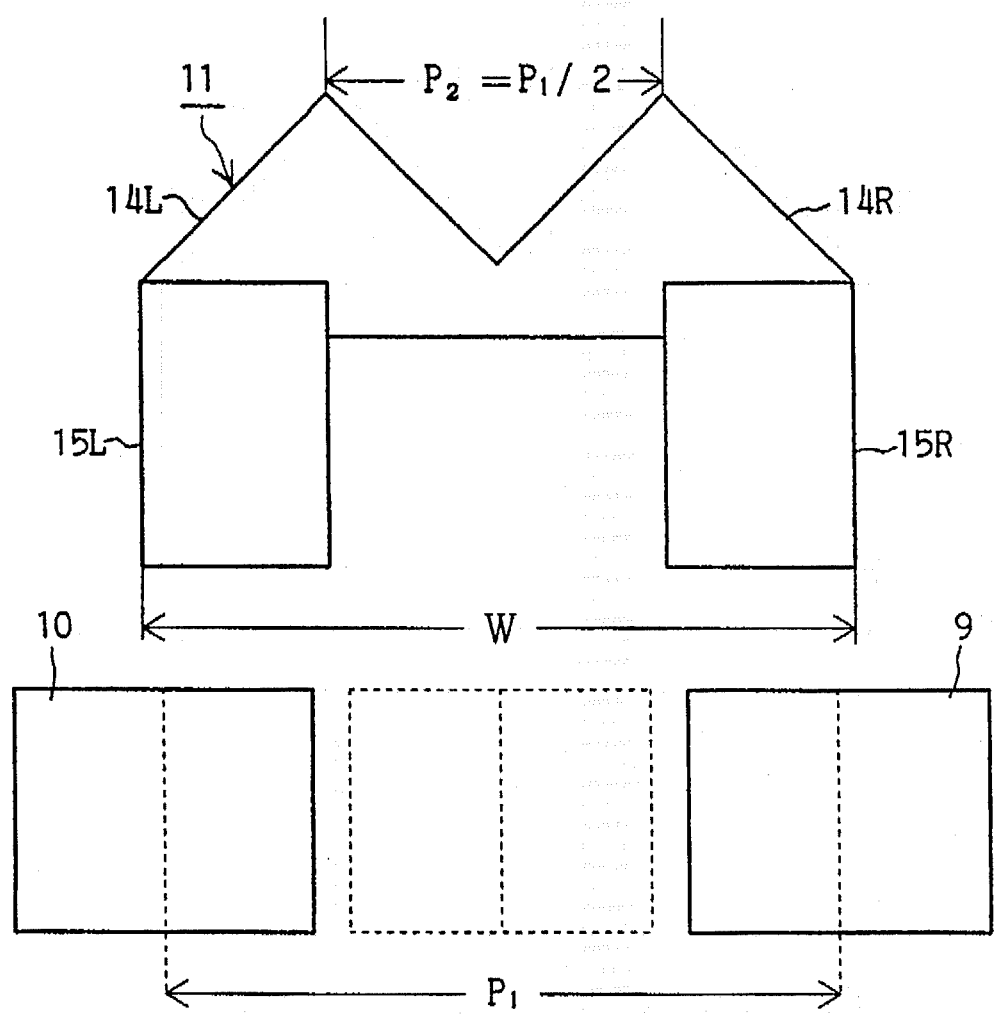
FIG. 3 is a diagram illustrating a relationship between the size of the prism and the pitch of the focal plates.

Referring to FIG. 3, the pitch $P_2$ between the vertexes of the 180-degree reflection prism units 14L and 14R of the prism 11 is one-half the pitch $P_1$ between the centers of the right and left exposed pictures, and the total width W is slightly broader than the pitch $P_1$ of the pictures.

Figure 4:
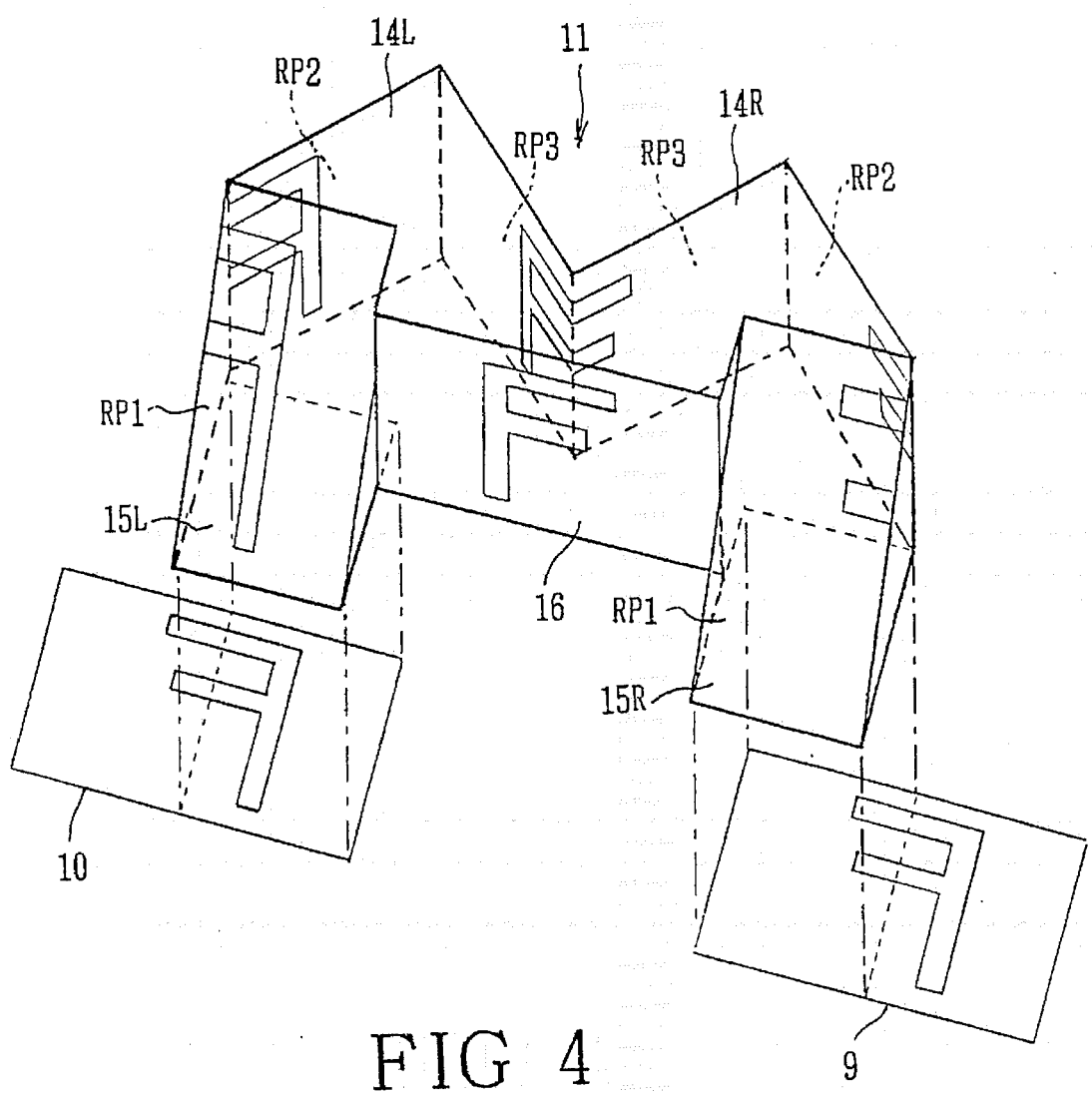
FIG. 4 is a perspective view of the prism of FIG. 2.
Figure 5A:
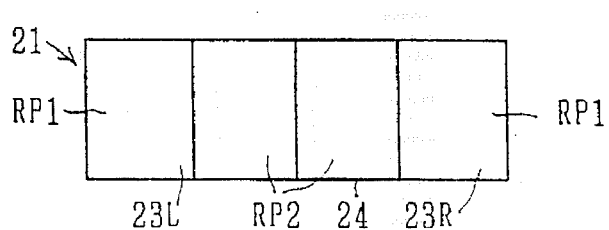
FIG. 5a is a plan view.
Figure 5E:
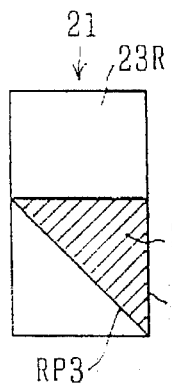
FIG. 5e is a view along the line 5e—5e of FIG. 5b.
Figure 5B:
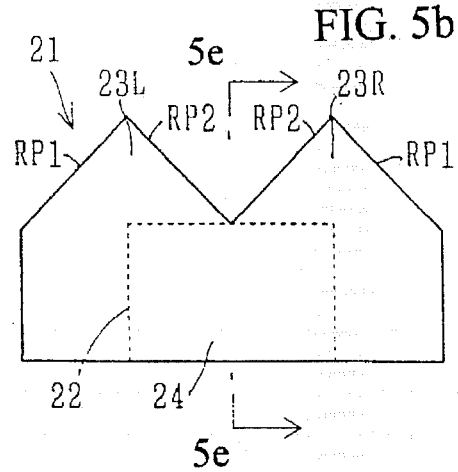
FIG. 5b is a front view.
Figure 5F:
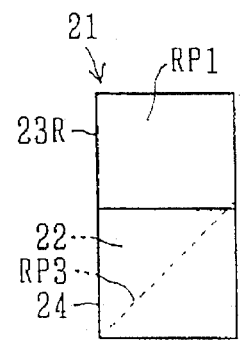
FIG. 5f is a side view.
Figure 5C:
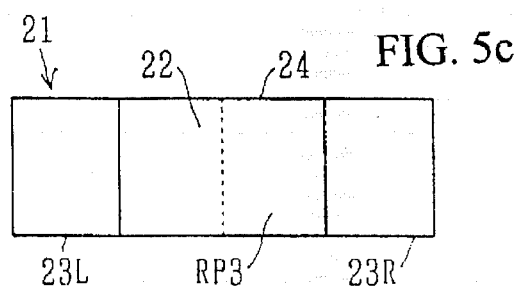
FIG. 5c is a bottom view.
Figure 5D:
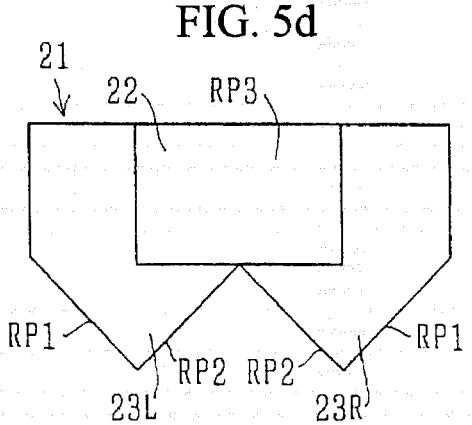
FIG. 5d is a back view.

Referring to FIG. 4, the prism 11 is such that the planes of incidence of the right and left 90-degree total reflection prism units 15L and 15R are arranged on the right and left focal plates being faced to the inner one-half regions of the focal plates 9 and 10, so that the light rays incident on the 90-degree reflection prism units 15L and 15R from the lower direction are totally reflected three times and go out in the horizontal direction from the projection plane 16.

The upside down and right side left inverted images that have passed through the lenses 4 and 5 are inverted upside down by the reflex mirrors 7 and 8, and erect right side left inverted images are formed on the focal plates 9 and 10. Images of the inner one-half portions of the right and left focal plates 9 and 10 are symmetrically inverted right side left, i.e., the outer one-half portions of the photographing ranges of the right and left lens 4 and 5 are symmetrically inverted right side left by the prism 11. Therefore, the erect image of the outer one-half portion in the photographing range of the left lens 5 is projected onto the left one-half portion of the projection plane 16 of the prism 11, and the erect image of the outer one-half portion in the photographing range of the right lens 4 is projected onto the right one-half portion of the projection plane 16 thereby to synthesize a picture. The focal plates 9 and 10 need not have the same size as the picture but may have a size which is equal to, or slightly larger than, that of the plane of incidence of the prism which has a size nearly one-half the size of the picture.

Figure 6:
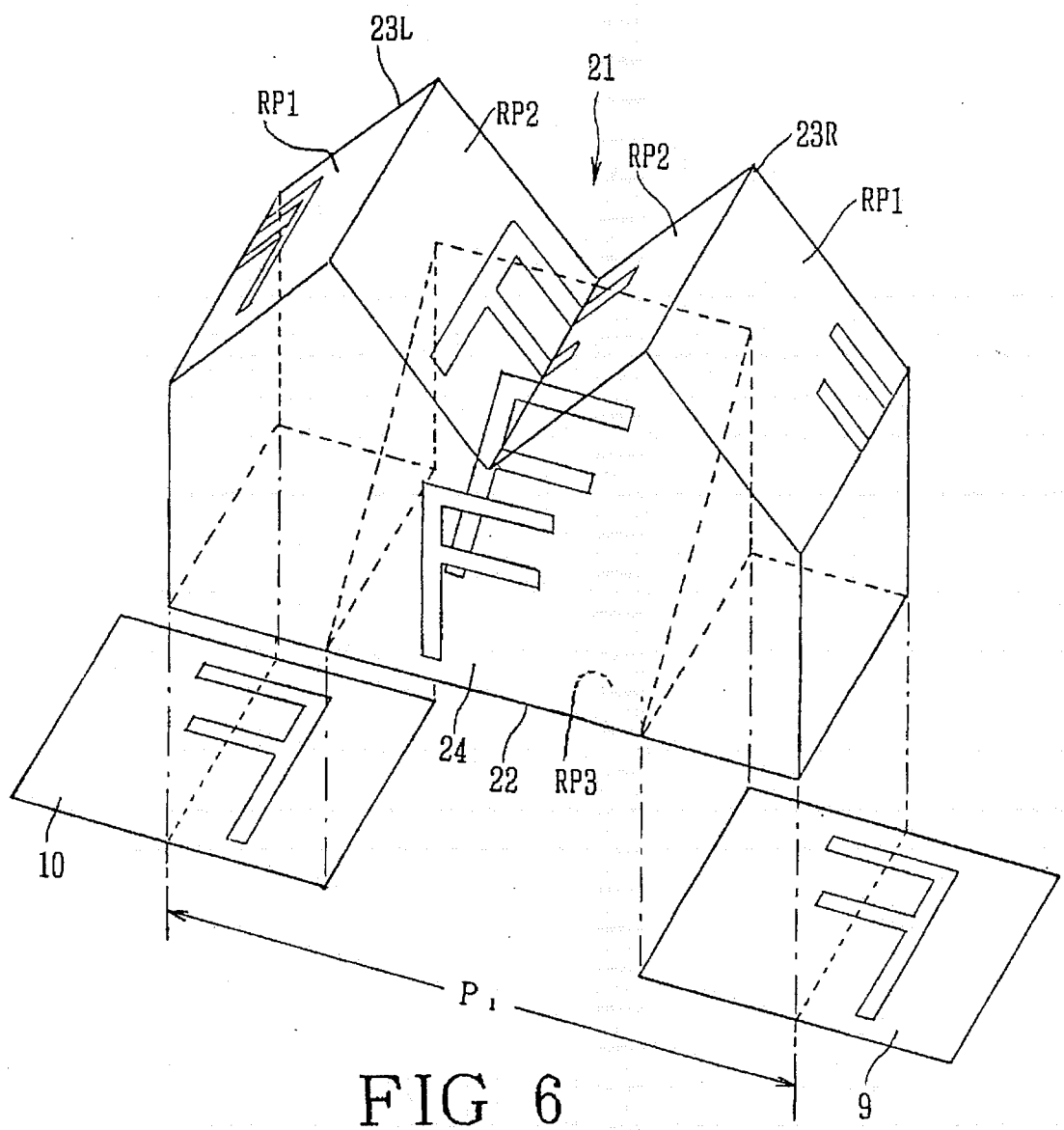
FIG. 6 is a perspective view of the prism of FIG. 5.

FIGS. 5 and 6 illustrate another embodiment of the prism. Contrary to the prism 11 shown in FIG. 2, this prism 21 has the inner one-half portions of the projection planes of the 180-degree reflection prism units 23L and 23R joined to the right and left one-half portions of the central 90-degree reflection prism unit 22. Like the prism 11 shown in FIG. 2, the light rays are totally reflected three times. The pitch between the vertexes of the 180-degree reflection prism units 23L and 23R, and the total width, are the same as those of the prism 11.

Referring to FIG. 6, images of the inner one-half portions of the right and left focal plates 9 and 10 are incident on the outer one-half planes of incidence of the 180-degree prism units 23L and 23R of the prism 21 installed on the focal plates 9 and 10, and are totally reflected three times by the reflection planes RP1, RP2 and RP3, so that an erect image is projected onto the central projection plane 24, the erect image being synthesized into a picture by the right and left one-half pictures.

The planes of incidence of the prisms 11, 21 facing the reflex mirrors 7 and 8 may be matted to form focal planes of the form of a ground glass to omit the focal plates 9 and 10. Furthermore, aluminum or the like may be deposited on the reflection planes RP1, RP2 and RP3 of the prisms 11, 21 and 34 to form mirror surfaces.

Figure 7:
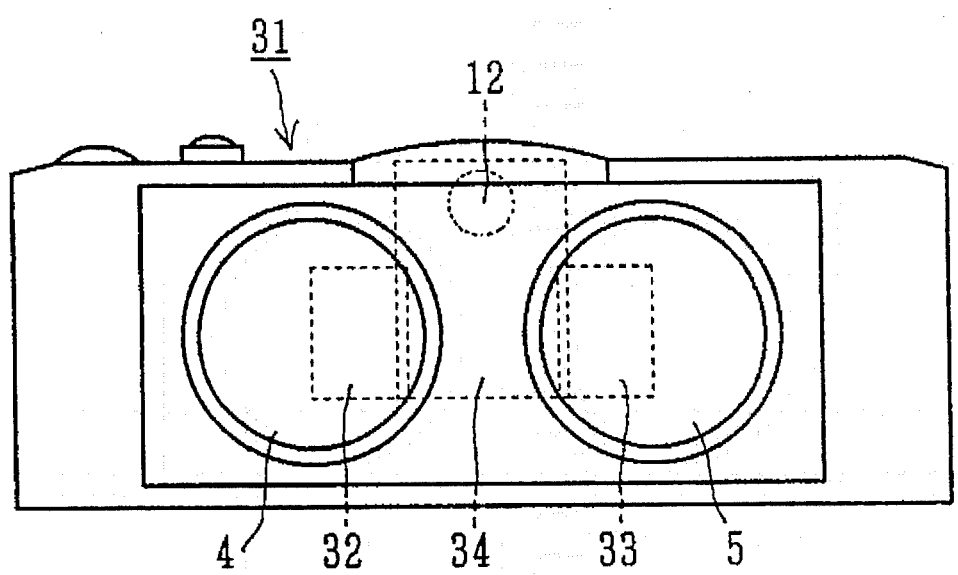
FIG. 7 is a front view of a stereo camera according to another embodiment.
Figure 8A:
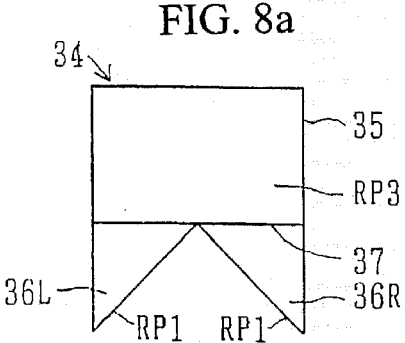
FIG. 8a is a plan view.
Figure 8E:
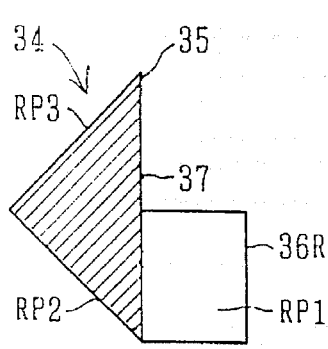
FIG. 8e is a view along the line 8e—8e of FIG. 8b.
Figure 8B:
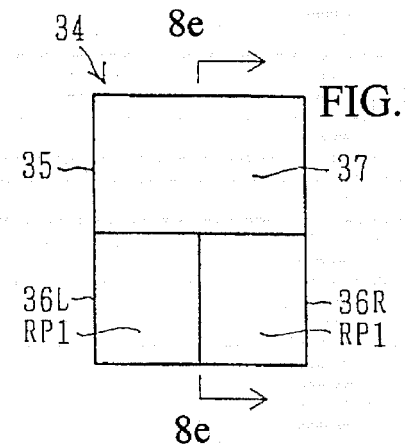
FIG. 8b is a front view.
Figure 8F:
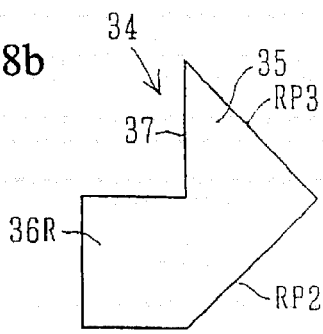
FIG. 8f is a side view.
Figure 8C:
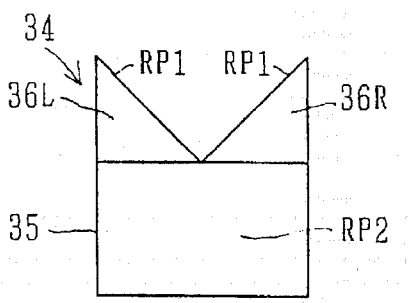
FIG. 8c is a bottom view.
Figure 8D:
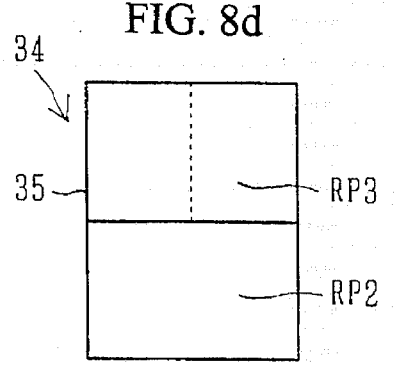
FIG. 8d is a back view.

FIGS. 7 to 10 illustrate a further embodiment. The focal point-adjusting mechanism of a stereo camera 31 shown in FIG. 7 is the same as that of the stereo camera 1 of FIG. 1, but the finder mechanism is constituted by vertical reflex mirrors 32 and 33 that turn in the horizontal direction, and a prism 34 inserted between the right and left reflex mirrors 32 and 33.

Figure 9:
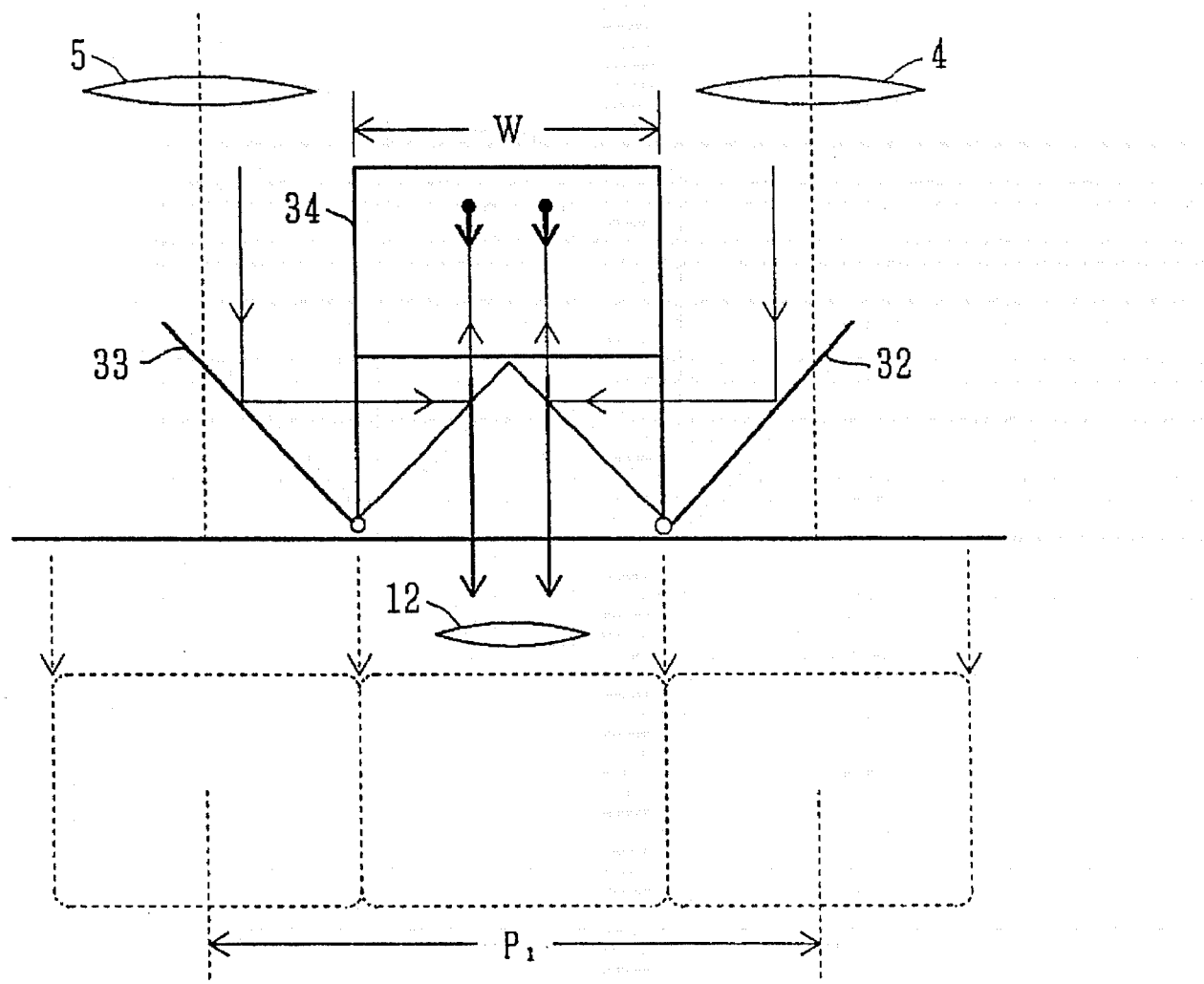
FIG. 9 is a diagram illustrating the arrangement of the prism and the reflex mirror in the stereo camera of FIG. 7.

Referring to FIG. 8, the prism 34 has a shape in which 90-degree reflection prism units 36L and 36R are joined to the right and left one-half portions of the lower planes of incidence of a 180-degree reflection prism unit 35 that displaces the light paths of the incident light and reflected light in parallel in the upper and lower direction. Planes of incidence of the 90-degree reflection prism units 36L and 36R are vertical planes facing outwards and sidewards. Referring to FIG. 9, furthermore, the total width W of the prism 34 is one-half the pitch $P_1$ between the centers of the right and left exposed pictures of the stereo camera.

Figure 10:
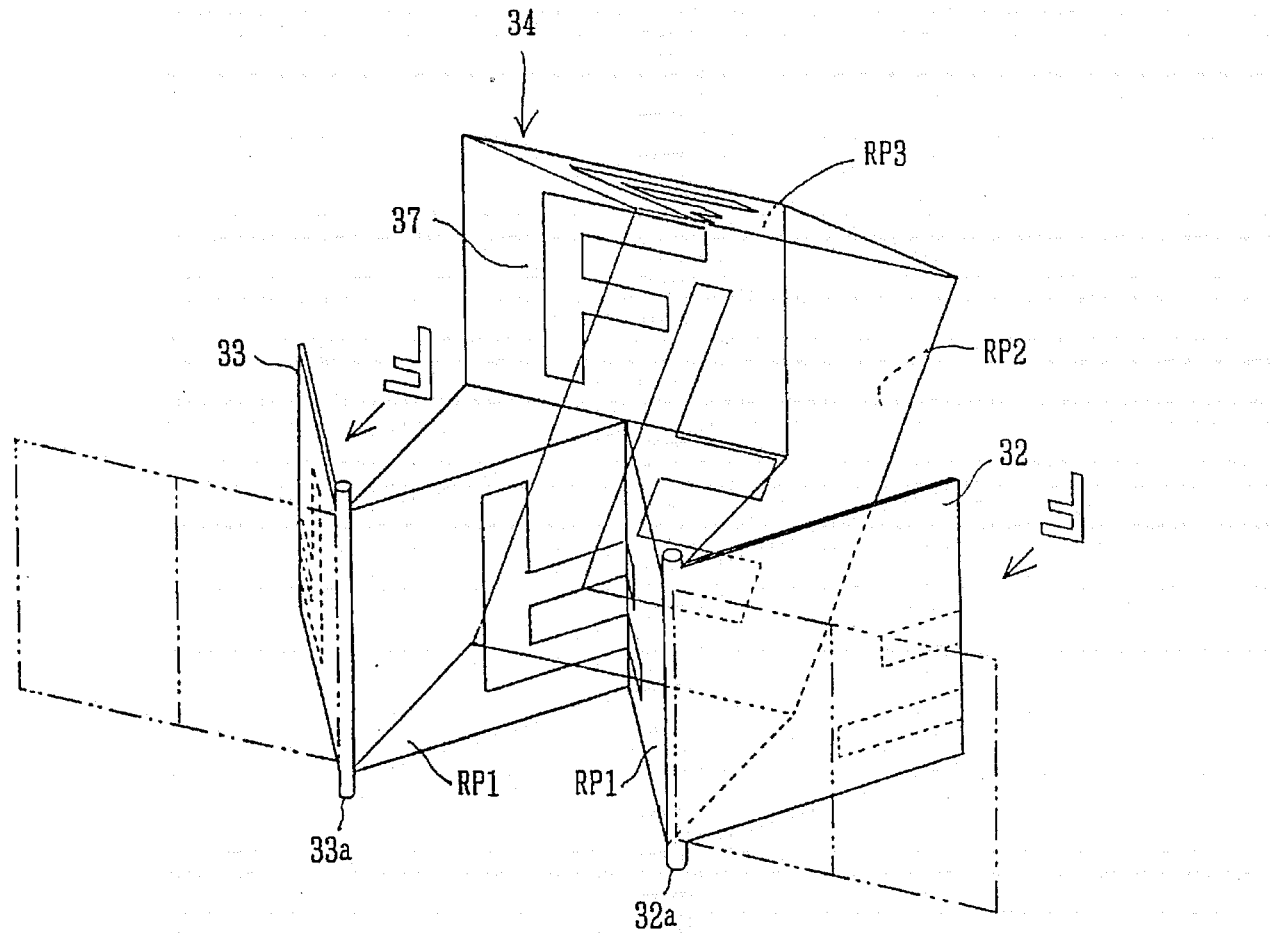
FIG. 10 is a perspective view illustrating the arrangement of the prism and the reflex mirror in the stereo camera of FIG. 7.

The vertical reflex mirrors 32 and 33 disposed on the right and left of the prism 34 rotate in the horizontal direction with pivots 32a and 33a shown in FIG. 10 as centers of rotation. At the time of taking a picture, the vertical reflex mirrors 32 and 33 rotate toward the side plane of the prism 34 from the standby position of 45 degrees with respect to the main axis of light, and retreats from the light path linking the lenses 4 and 5 to the surface of the film.

When the vertical reflex mirrors 32 and 33 are at the standby position, the pictures of the outer one-half portions in the photographing ranges of the right and left lenses 4 and 5 are inverted right side left by the reflex mirrors 32 and 33, and are incident on the 90-degree reflection prism units 36L and 36R of the prism 34. Referring to FIG. 10, the pictures are totally reflected three times by the reflection planes RP1 of the 90-degree reflection prism units 36L and 36R and by the reflection planes RP2 and RP3 of the 180-degree reflection prism unit 35. On the upper projection plane 37 of the 180-degree reflection prism unit 35, there appears an aerial image synthesized by an erect image of the outer one-half portion in the photographing range of the left lens 5 and by an erect image of the outer one-half portion in the photographing range of the right lens 4.

In this stereo camera 31, the prism 34 is inserted between the right and left exposed pictures making it possible to greatly decrease the height of the camera. If the planes of incidence of 90-degree reflection prism units 36L and 36R of the prism 34 are matted to form focal planes, the focal point can be adjusted while observing the real images focused on the focal planes, and adjustment of the focal point can be facilitated.

Figure 11:
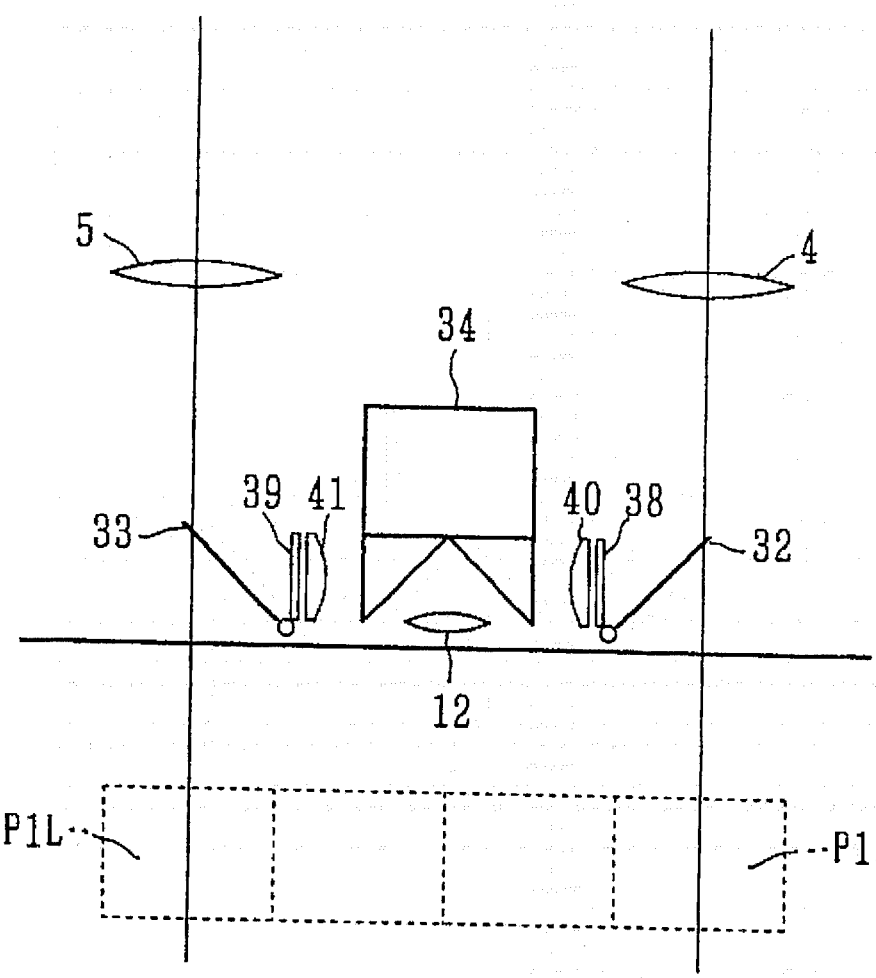
FIG. 11 is a diagram of a further embodiment of the stereo camera of FIG. 7 and illustrates the arrangement of the prism and the reflex mirror.

FIG. 11 illustrates a further embodiment of the stereo camera 31, wherein the exposed pictures are so arranged that two other picture frames are disposed between a pair of right and left pictures P1L and P1R on the film. In this case, the vertical reflex mirrors 32 and 33 are disposed at positions remote from the side planes of the prism 34. As shown in FIG. 11, therefore, focal plates 38 and 39 are disposed between the reflex mirrors 32, 33 and the prism 34, so that the image on the focal plates are incident upon the prism 34. The finder image will become more bright and easy to see if condenser lenses 40 and 41 are arranged at the back of the focal plates 38 and 39.

Figure 12:
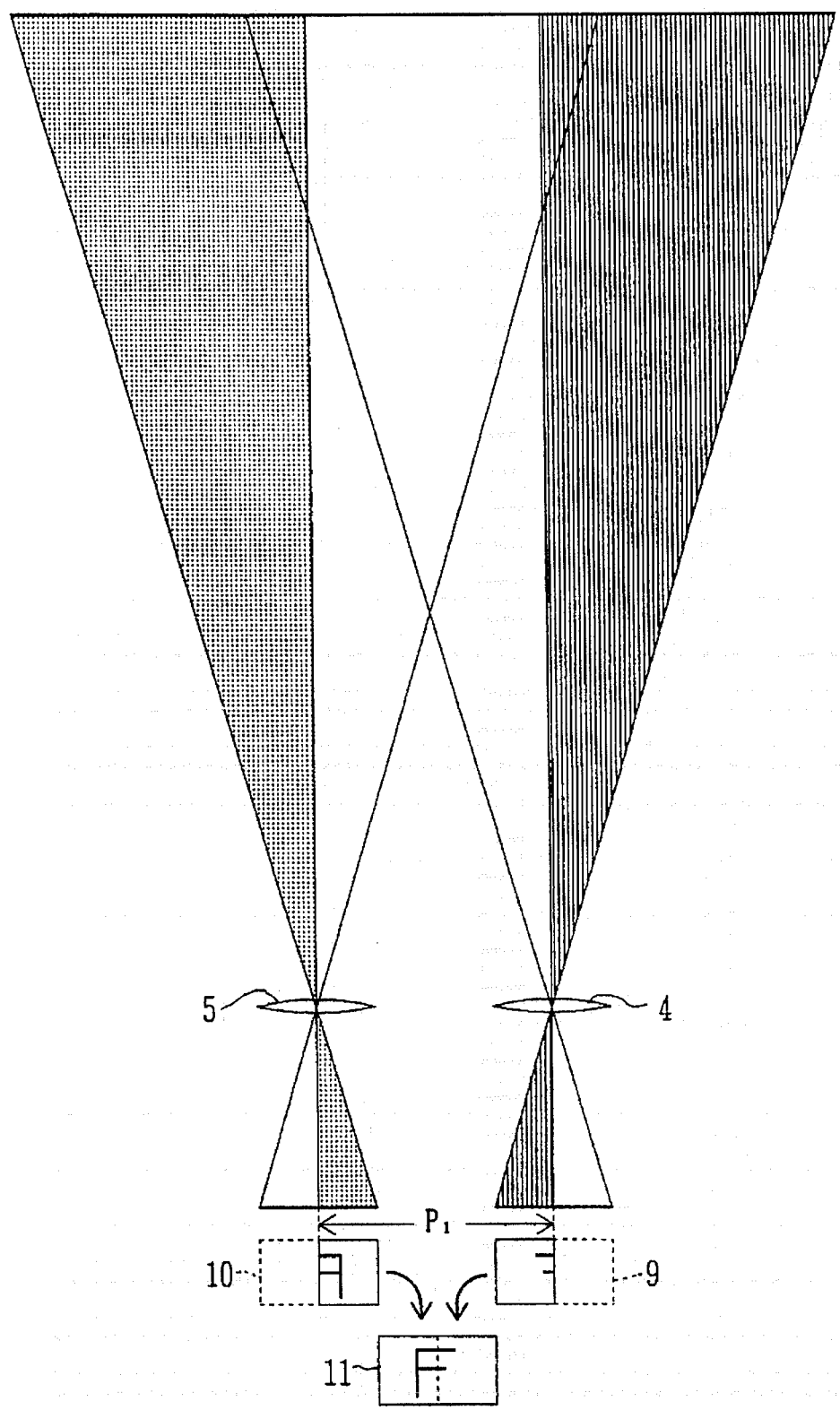
FIG. 12 is a diagram illustrating the photographing ranges and visual fields through the finder of the stereo camera shown in FIG. 1.

As shown in FIG. 12, the right and left lenses 4 and 5 of the stereo camera 1, 31 are arranged in parallel with their center axes being located at the centers of the exposed pictures so that the photographing ranges will come into agreement at infinity. Moreover, the user sees a finder image synthesized by the outer one-half portions of the visual fields of the right and left lenses 4 and 5. Accordingly, the center regions lie outside the visual field, the center regions heading toward the right and left centers of the photographing ranges maintaining a width which is equal to the pitch $P_1$ between the lenses 4, 5 and is equal to the pitch $P_1$ between the centers of the right and left exposed pictures. However, the range that cannot be seen is a narrow linear region, and almost no subject is unseen in this range except when a subject is photographed in a close range. By deflecting the stereo camera in the horizontal direction, furthermore, the subject can be seen over the whole photographing range, and there exists no inconvenience in taking pictures.

Figure 13:
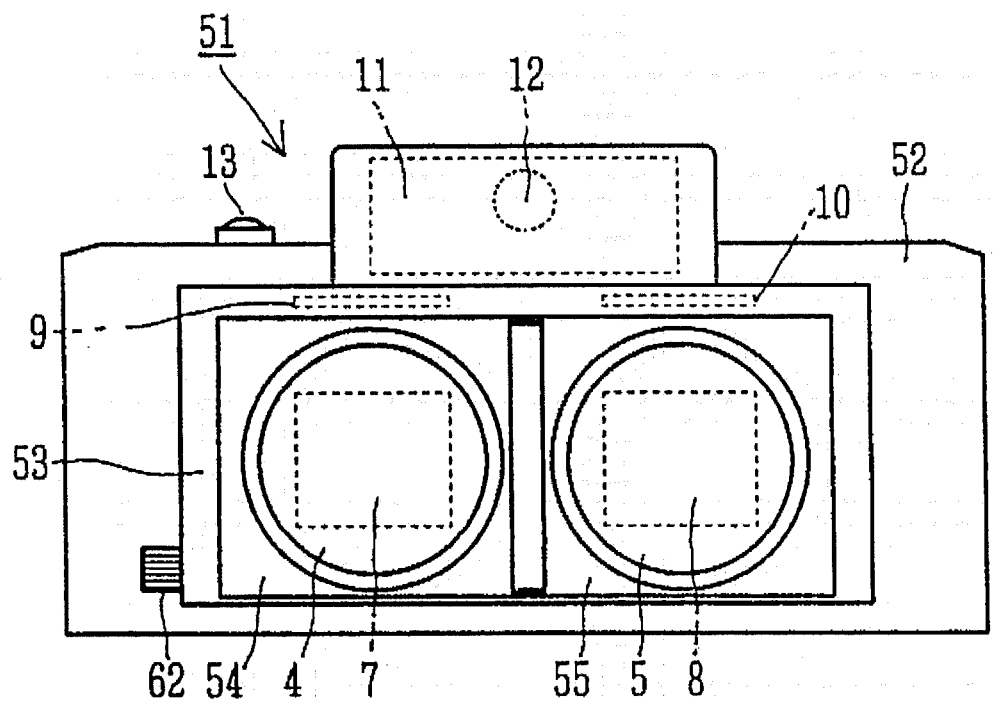
FIG. 13 is a front view of the stereo camera.

FIG. 13 illustrates the stereo camera 51. Like the aforementioned stereo camera 1, a slide frame 53 is mounted on a camera body 52 to slide back and forth on the front surface of the slide frame 53 are symmetrically mounted a pair of lens boards 54 and 55 to which the lenses 4 and 5 are fitted. Over the focal plates 9 and 10 are arranged a prism 11 or 21 and an eyepiece 12 like in the stereo camera 1 of FIG. 1. The right and left lens boards 54 and 55 are mounted on the slide frame 53 to slide toward the right and left, and the distance between the lens boards 54 and 55 can be expanded and contracted symmetrically toward the right and left by a feed screw mechanism.

Figure 14:
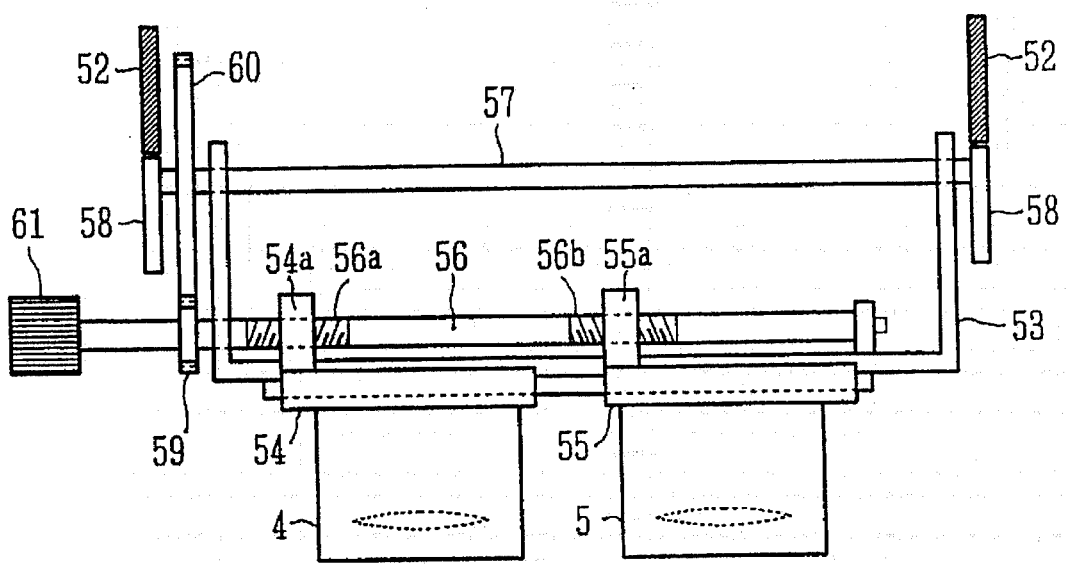
FIG. 14 is a diagram illustrating a focal point adjusting mechanism and a mechanism for adjusting the distance between the centers of the lenses in the stereo camera.

FIG. 14 illustrates a focal point adjusting mechanism and a mechanism for adjusting the distance between the centers of the lenses. A feed screw 56 mounted in a horizontal direction on a front portion of the slide frame 53 has a left hand screw 56a threaded on the left side and has a right handed screw 56b threaded on the right side. An internal thread portion 54a of the left lens board 54 meshes with the left hand screw 56a, and an internal thread portion 55a of the right lens board 55 meshes with the right hand screw 56b, so that the lens boards 54 and 55 can be moved within a predetermined range in a direction in which the right lens 5 and the left lens 4 approach each other from the positions at which the pitch between the centers of the right and left lenses is equal to the pitch $P_1$ between the right and left exposed pictures.

A cam shaft 57 is supported at a rear part of the slide frame 53, and a cam 58 for adjusting the focal point is attached to both ends of the cam shaft 57. The slide frame 53 is backwardly (upwards in FIG. 14) urged by a spring (not shown) so that the cams 58 are pushed onto the cam-receiving surfaces of the camera body 52. The slide frame 53 slides back and forth accompanying the turn of the cam shaft 57.

The feed screw 56 and the cam shaft 57 are coupled together via spur gears 59 and 60. Upon turning an adjustment knob 61 attached to an end of the feed screw 56, the lens boards 54, 55 and the slide frame 53 move being interlocked together, so that the focal points and the distance between the centers of the lenses are adjusted.

Figure 15:
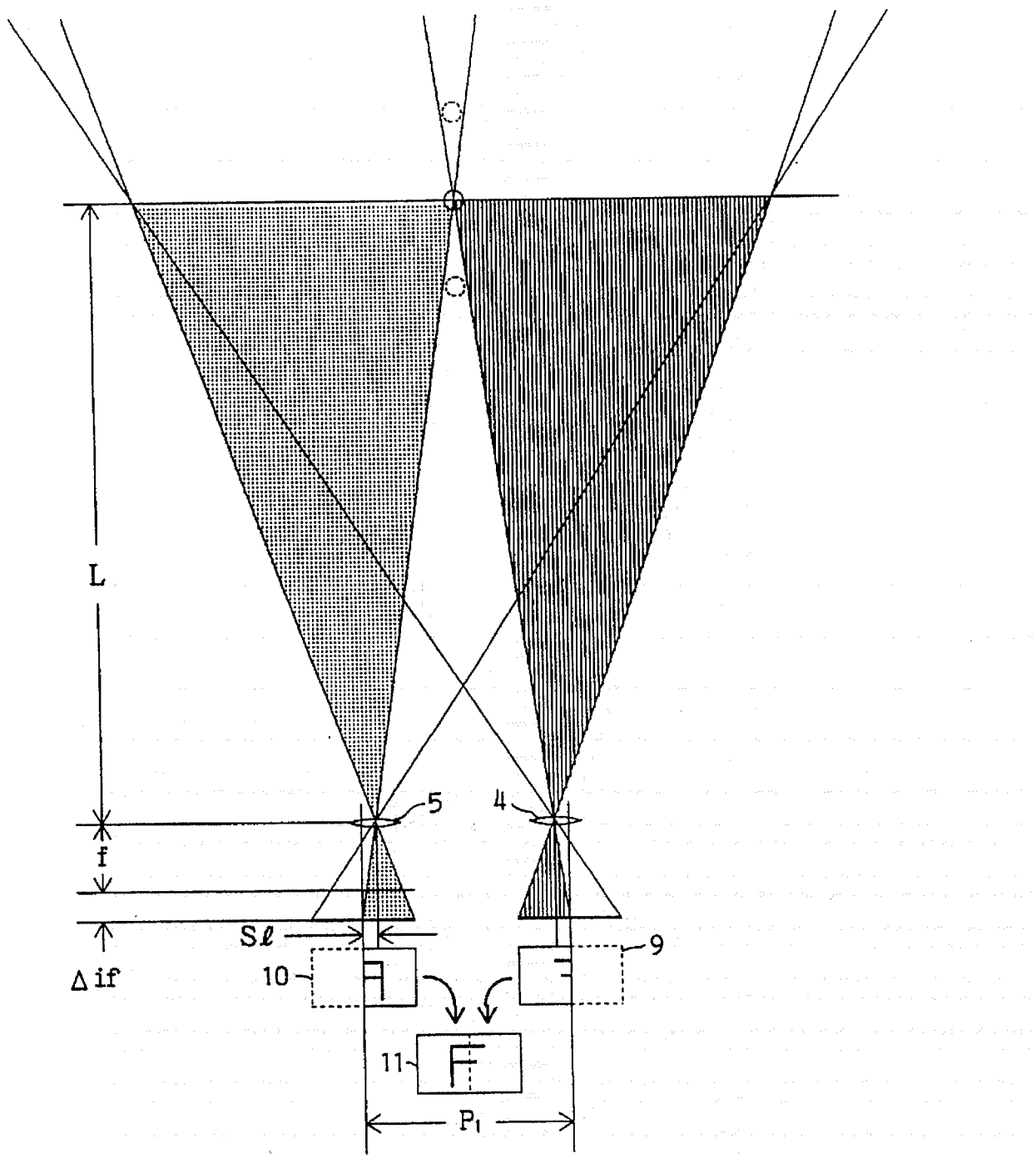
FIG. 15 is a diagram illustrating a relationship between adjusting the focal point and adjusting the distance between the centers of the lenses in the stereo camera of claim 2.

FIG. 15 illustrates a relationship between the focal point of the lens and the distance between the centers of the lenses. Let it now be presumed that a piece of thin lens is employed and that:

| | |
|---|---|
| Focal distance of the lens | f |
| Distance from the subject to the principal point of the lens | L |
| Distance from the focal point of the lens to the image-forming position | $\Delta if$ |

Then, there holds $\Delta if = f^2/L - f$ and, hence, the distance between the principal point of the lens to the surface of the film becomes $f + \Delta if$.

Moreover, if the pitch between the right and left exposing surfaces of the stereo camera is $P_1$, the shifting amount S1 of the right and left lenses for bringing the right and left photographing ranges into agreement is given by, $$S1=(P_1/2)\times(f+\Delta if/L+f+\Delta if).$$

That is, the right and left lenses may be moved in a direction to approach each other by a shifting amount S1 calculated from the above equation with a decrease in the distance L from the subject to the principal point of the lens.

Accordingly, the pitch of the feed screw 56 and the shape of the cams 58 are so determined as to satisfy the above-mentioned equation. That is, the slide frame 53 moves due to the cams 58 relative to the lens boards 54 and 55 that move in proportion to the rotational angle of the adjusting knob 61, and is delivered in an amount that exponentially increases as the shooting distance becomes short, bringing the right and left photographing ranges to come into agreement with each other irrespective of the shooting distance.

Therefore, parallax of the subject is automatically corrected irrespective of the shooting distance, and the subject at the focal position is photographed on both the right and left pictures nearly at the same position. In mounting the film on the stereo slide mount, therefore, there is almost no need to correct the parallax by adjusting the pitch of the film. This further makes it possible to decrease the non-overlapping portions on the right and left pictures that must be shielded by the windows of the slide mount and, hence, to obtain a stereo slide with decreased Loss of picture.

It is also possible to form, as a unitary structure, the whole moving portions inclusive of lenses 4, 5, lens boards 54, 55 and slide frame 53 excluding the camera body 52 shown in FIG. 14, enabling the lens unit to be interchanged. This makes it possible to use lens units having various focal distances by designing the pitch of the feed screw and the shape of the cams to meet the focal distances of the lenses.

Figure 16A:
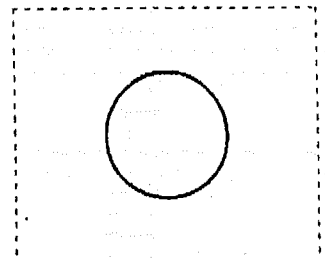
FIG. 16a is a diagram of the subject.
Figure 16B:
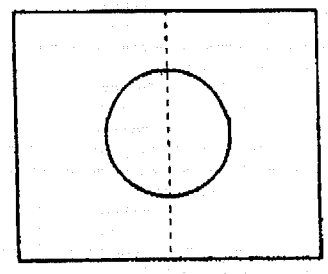
FIGS. 16b, 16c and 16d are diagrams of finder images of the subject.
Figure 16C:
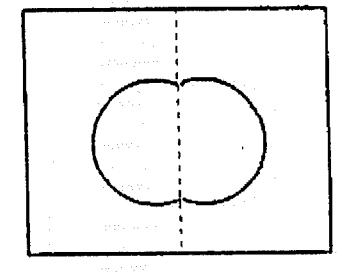
Figure 16D:
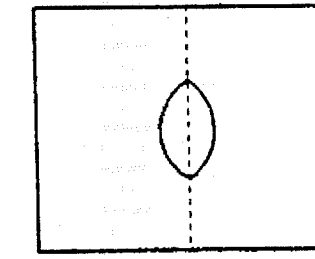

In the above-mentioned stereo camera 51, the state of correcting the parallax can be confirmed by viewing through the eyepiece 12. FIG. 16a shows a subject, and FIGS. 16b, 16c and 16d show finder images. When the stereo camera is turned in the horizontal direction so that the subject shown in FIG. 16a is positioned at the center of the picture, the subject that is in focus is positioned on an intersecting point of the visual fields of the right and left prisms, and appears in a real shape as shown in FIG. 16b. The subject that is farther than the focal point, i.e., farther than the intersecting point of visual fields of the right and left prisms, appears being broadened as shown in FIG. 16c. The subject that is more distant appears in a double image that is split into the right and left. When the subject is nearer than the intersecting point of visual fields of the right and left prisms, on the other hand, a portion that has entered into the central dead angle is masked as described earlier and appears being narrowed as shown in FIG. 16d. By so turning the adjustment knob 61 that the subject in a close-range view in the finder image appears in a real shape, it is allowed to take a picture in a state where the parallax is property corrected.

Depending upon the subject, furthermore, the parallax may not be easily corrected and the focal point may not be easily adjusted. When the subject is a vertical line or a horizontal line, in particular, it may be difficult to determine the state of focus and parallax. In such a case, the stereo camera should be tilted from the horizontal state toward either rightwards or leftwards to easily make sure the state where the focal point is adjusted.

Figure 17A:
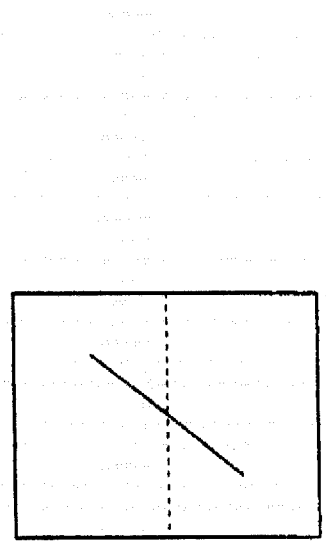
FIGS. 17a, 17b and 17c are diagrams illustrating finder images of a subject.
Figure 17B:
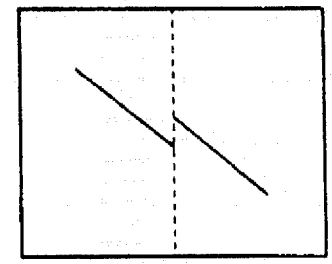
Figure 17C:
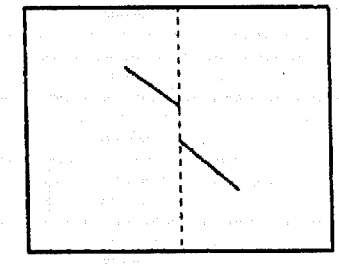

FIG. 17 shows a finder image of when the stereo camera is tilted from the horizontal state to either the right or the left.

In the focused state, the linear subject appears continuously as shown in FIG. 17a. When the subject is farther than the focal position, the right and left image move in a direction to separate away from each other so that the linear subject is cut at the center as shown in FIG. 17b. When the subject is nearer than the focal position, the right and left subjects approach. Even in this case, the linear subject is cut at the center, making it easy to adjust the focal point and to judge whether the parallax is property corrected or not.

In the stereo camera 1 mentioned earlier, there exist non-overlapping visual fields on the outer sides of the right and left photographed pictures, and these non-overlapping portions are masked by the Window frame of the stereo slide mount in a customary manner.

In the stereo camera 51, the parallax is corrected being interlocked to the adjustment of focal point, and non-overlapping portions are not almost formed on the right and left pictures. When a picture is taken in a state in which the major subject in focus is at a distance and the correction of parallax for the subject in a close-range view is insufficient, however, it may often become necessary to correct the parallax by masking the outer sides of the right and left picture films when they are to be mounted in a customary manner.

Figure 18:
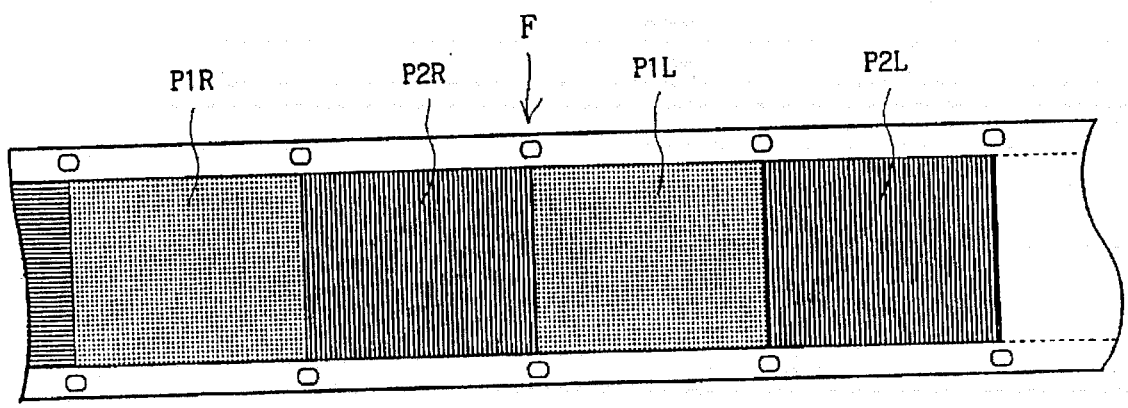
FIG. 18 is a front view of a film illustrating the arrangement of exposed pictures of the stereo camera.

FIG. 18 illustrates the arrangement of pictures in the stereo camera proposed in view of the characteristics of the stereo camera that needs parallax correction at the time of mounting. Since the edges of pictures of the film F are masked at the time of mounting, no gap is provided among the pictures on the film; i.e., the exposed pictures are so arranged that the shooting is effected in a state where the neighboring pictures are in contact with each other. This enables the effective picture areas to be maximized with a limited pitch of pictures.

The present invention is in no way limited to the above-mentioned embodiments only but can be modified in a variety of ways within the technical scope of the invention, such as applying the finder constitution of the stereo camera shown in FIGS. 7 to 11 to the stereo camera 51 of FIG. 13, and it should be noted that the present invention encompasses such modified embodiments, as a matter of course.

With the stereo camera of the present invention as described above in detail, a picture synthesized by combining one-half portions of the right and left pictures is viewed through a single finder. Therefore, it becomes easier to view the image and to operate the stereo camera than the stereo camera equipped with two finders. Besides, the cost for producing the finder can be decreased compared with the conventional stereo cameras having two pentaprisms, and the reflex-type stereo camera can be offered at a reduced price.

In the stereo camera, furthermore, correction of parallax and adjustment of focal point can be judged relying upon a finder image. Accordingly, a picture can be taken so as to obtain a maximum of stereo effect while suppressing loss of pictures.

I claim:

1. A stereo camera of the reflex type comprising two right and left optical systems of a single-lens reflex camera each including a lens, a reflex mirror and a prism, which are mounted on a camera body, enabling images incident on the right and left lenses to be observed through the reflex mirrors and the prisms, wherein a composite prism is provided to synthesize an erect image by symmetrically inverting right side left the outer one-half pictures within the photographing ranges of the right and left lenses, so that outer one-half pictures within the photographing ranges of the right and left lenses can be observed by one eye.

2. A stereo camera according to claim 1, wherein the distance between the centers of the right and left lenses is freely adjusted, and an interlocking mechanism is disposed between a focal point adjusting mechanism and a mechanism for adjusting the distance between the centers of the lenses, so that the photographing ranges of the right and left lenses at a focal distance are brought into agreement with each other at all times.

3. A stereo reflex camera comprising:

a camera body;

a first lens attached to said camera body, said first lens having a first optical axis;

a second lens attached to said camera body, said second lens having a second optical axis, the first optical axis and the second optical axis being separated by a distance;

a first reflex mirror positioned to receive light from said first lens;

a second reflex mirror positioned to receive light from said second lens;

a first focal plate positioned to receive light reflected from said first reflex mirror;

a second focal plate positioned to receive light reflected from said second reflex mirror;

a prism having a first reflection prism unit positioned to receive light from a first portion of said first focal plate, and a second reflection prism unit positioned to receive light from a second portion of said second focal plate, and a third reflection prism unit positioned to combine light from the first reflection prism unit and the second reflection prism unit, whereby an image is formed;

a focal point adjusting mechanism attached to said camera body; and a mechanism for adjusting the distance between said first lens and said second lens coupled to said focal point adjusting mechanism, whereby a relationship between a focal point of said first lens and said second lens and the distance between said first lens and said second lens can be maintained, said mechanism for adjusting the distance between said first and said second lens includes a feed screw having a left hand thread on one portion and a right hand thread on another portion; and said focal point adjusting mechanism includes a cam coupled to the feed screw through a spur gear.

4. A stereo reflex camera comprising:

a camera body;

a first lens attached to said camera body, said first lens having a first optical axis;

a second lens attached to said camera body, said second lens having a second optical axis, the first optical axis and the second optical axis being separated by a distance;

a first reflex mirror positioned to receive light from said first lens;

a second reflex mirror positioned to receive light from said second lens;

a first reflective prism unit positioned between said first lens and said second lens to receive light from said first reflex mirror;

a second reflective prism unit positioned between said first lens and said second lens to receive light from said second reflex mirror;

a third reflective prism unit positioned between said first lens and said second lens to receive light from said first reflective prism unit and said second reflective prism unit, whereby a synthesized image is formed from portions of images from said first lens and said second lens;

a focal point adjusting mechanism attached to said camera body; and a mechanism for adjusting the distance between said first lens and said second lens coupled to said focal point adjusting mechanism, whereby a relationship between a focal point of the lens and the distance between said first lens and said second lens can be maintained.

* * * * *